(12) United States Patent
Yu et al.

(10) Patent No.: US 12,391,616 B2
(45) Date of Patent: Aug. 19, 2025

(54) HIGH WATER REDUCTION POWDER PREPARATION FOR DRY MORTAR

(71) Applicant: SIKA TECHNOLOGY AG, Baar (CH)

(72) Inventors: Chao Yu, Suzhou (CN); Jiali Zhu, Suzhou (CN); Jianghong Liu, Suzhou (CN); Lin Chen, Suzhou (CN)

(73) Assignee: SIKA TECHNOLOGY AG, Baar (CH)

( * ) Notice: Subject to any disclaimer, the term of this patent is extended or adjusted under 35 U.S.C. 154(b) by 997 days.

(21) Appl. No.: 17/598,349

(22) PCT Filed: Mar. 26, 2020

(86) PCT No.: PCT/CN2020/081401
§ 371 (c)(1),
(2) Date: Sep. 27, 2021

(87) PCT Pub. No.: WO2020/192735
PCT Pub. Date: Oct. 1, 2020

(65) Prior Publication Data
US 2022/0185732 A1   Jun. 16, 2022

(30) Foreign Application Priority Data
Mar. 26, 2019   (CN) .......................... 201910229736.9

(51) Int. Cl.
| | | |
|---|---|---|
| C04B 24/32 | (2006.01) | |
| C04B 20/00 | (2006.01) | |
| C04B 28/02 | (2006.01) | |
| C04B 40/00 | (2006.01) | |
| C08F 290/14 | (2006.01) | |
| C08J 3/12 | (2006.01) | |

(52) U.S. Cl.
CPC .......... *C04B 24/32* (2013.01); *C04B 20/0016* (2013.01); *C04B 28/02* (2013.01); *C04B 40/0042* (2013.01); *C08F 290/142* (2013.01); *C08J 3/122* (2013.01); *C08J 2351/08* (2013.01)

(58) Field of Classification Search
CPC ..... C04B 24/32; C04B 20/0016; C04B 28/02; C04B 40/0042; C08F 290/142; C08J 3/122; C08J 2351/08
See application file for complete search history.

(56) References Cited

U.S. PATENT DOCUMENTS

| | | |
|---|---|---|
| 6,573,316 B1 | 6/2003 | Albrecht et al. |
| 7,030,178 B2 | 4/2006 | Shiba et al. |
| 2008/0139701 A1 | 6/2008 | Danzinger et al. |
| 2014/0135427 A1 | 5/2014 | Gallegos et al. |

FOREIGN PATENT DOCUMENTS

| | | |
|---|---|---|
| CN | 1919922 A | 2/2007 |
| CN | 101824125 A | 9/2010 |
| CN | 101962273 A | 2/2011 |
| CN | 102911320 A | 2/2013 |
| CN | 103748054 A | 4/2014 |
| CN | 108084364 A | 5/2018 |
| CN | 108192041 A | 6/2018 |
| CN | 108349825 A | 7/2018 |
| CN | 109608590 A | 4/2019 |
| WO | 00/47533 A1 | 8/2000 |
| WO | 2006/129883 A1 | 12/2006 |
| WO | 2006/133933 A2 | 12/2006 |
| WO | 2011/089085 A1 | 7/2011 |
| WO | 2013/020862 A1 | 2/2013 |

OTHER PUBLICATIONS

Jun. 24, 2020 International Search Report issued in International Patent Application No. PCT/CN2020/081401.
Jun. 24, 2020 Written Opinion issued in International Patent Application No. PCT/CN2020/081401.

*Primary Examiner* — Angela C Scott
(74) *Attorney, Agent, or Firm* — Oliff PLC

(57) ABSTRACT

PCE-type copolymers in powder form can be obtained by spry-drying and are easily re-dispersed in water. The fineness and the anti-caking properties of said PCE-type copolymers in powder form, as well as their water reduction potential and influence on slump life are improved. A production process of said PCE-type copolymers in powder form is by a spray-drying method, and PCE-type copolymers can be used for the improvement of mineral binder compositions and especially dry mortars.

9 Claims, 1 Drawing Sheet

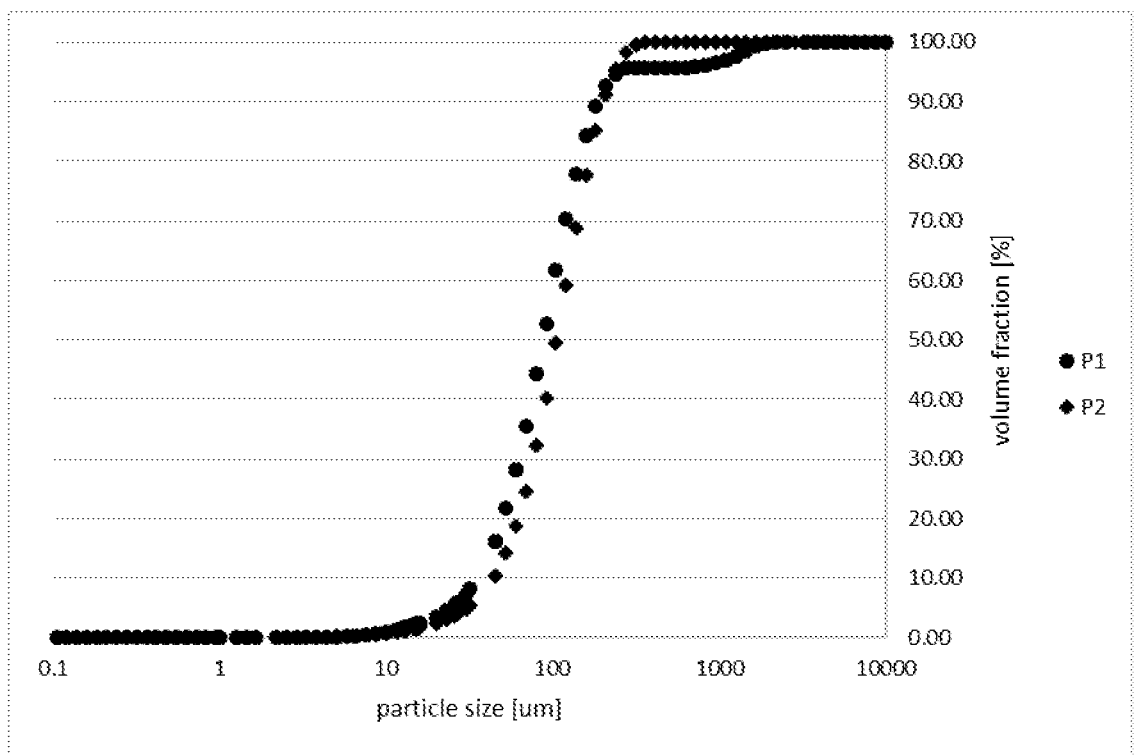

HIGH WATER REDUCTION POWDER PREPARATION FOR DRY MORTAR

TECHNICAL FIELD

The present invention pertains to PCE-type copolymers in powder form which can be re-dispersed in water, the production of said PCE-type copolymers in powder form and the use of such powdered PCE-type copolymers to modify dry mortars.

BACKGROUND OF THE INVENTION

Copolymers of polycarboxylates and polyalkylene glycols (PCE) are known for many years as dispersion aids for aqueous dispersions, especially for aqueous dispersions of mineral binders. PCE act as superplasticizers and reduce the water needed to achieve a certain level of fluidity of a given uncured mineral binder composition. A reduction of water in mineral binder compositions, especially in cementitious compositions, is desirable as it leads to less segregation of solid components in the uncured composition and to an increased compressive strength of the cured composition.

Factory pre-batched dry mortars are nowadays being used for new construction and refurbishment works. Such dry mortars have the advantage of improved consistency of properties, such as flowability, cure kinetics, and final strength, over mortars batched at a job site. The use of PCE in dry mortars requires a dry consistency, preferably a powdered form of said PCE. Furthermore, a dry consistency of a PCE reduces cost for transportation and storage of said PCE, especially if the dry PCE is redispersable in water and thus an aqueous solution or dispersion can be easily made at the place of usage.

WO 2006/133933 discloses PCE-type copolymers of olefinically unsaturated monocarboxylic acid based monomers copolymerized with monomers based on unsaturated long-chain polyalkylene glycol ethers. The copolymers can be spray-dried to form a powder. However, the architecture of the copolymers disclosed is not optimized for a spray-drying process. As a consequence powders with a tendency for caking and a particle size distribution not optimized for the use in dry mortars result.

WO 2006/129883 discloses a PCE-type copolymer with a neutralization degree of <50%, resulting in improved pulverization properties. Pulverization can be by various means including a spray-dry process. One disadvantage is that by the low degree of neutralization an increased tendency for powder caking still exists.

WO 00/47533 discloses a powdered PCE-based polymeric composition containing a mineral support, including silica. These powders are reported to have improved powder flow and improved anti-caking properties when compared to powders of the same PCE-type copolymer from a spray dry process. One disadvantage of these powders is that they cannot easily be redispersed to prepare stable aqueous polymer dispersions again.

CN 101824125 discloses a PCE-type copolymer with polyalkylene glycol chains of a molecular weight of from 600 to 2'000 g/mol. A spray-drying method to obtain powdered products is also disclosed. However, the spray drying process disclosed operates at high temperatures which requires higher energy input and has a risk of degradation of the PCE-type copolymers during spray-drying.

CN 101962273 discloses a process for preparation of a powdered PCE-type copolymer with added inorganic particles in a spray-dry process. However, a substantial amount of mineral carrier needs to be added in the spray-drying process to produce acceptable powder qualities. Additionally, the spray drying process disclosed operates at high temperatures which requires higher energy input and has a risk of degradation of the PCE-type copolymers during spray-drying.

Finally, U.S. Pat. No. 7,030,178 discloses powdered dispersants for hydraulic compositions which are based on PCE-type copolymers with a degree of alkoxylation in the side chain of 45-150, a ratio of monomers bearing alkoxylated side chains of 15-45 mol %, and a degree of neutralization of the carboxylic groups of 70-80%. Spray-drying is mentioned as a method to obtain said powdered dispersants. One disadvantage is that by the disclosed degree of neutralization a significant tendency for powder caking still exists.

There is thus a need for powdered PCE compositions which can be easily prepared by spray-drying and which overcome the above mentioned drawbacks.

DESCRIPTION OF THE INVENTION

It is an object of the present invention to provide a powdered PCE-type copolymer which can be obtained by spry-drying. Especially, the fineness and the anti-caking properties of the powder, as well as the water reduction potential and the influence on slump life of said powdered PCE-type copolymer in a mineral binder composition should be improved over the current state of the art.

It is another object of the present invention to provide a spray-drying process for the production of said powdered PCE-type copolymer.

It is yet another object of the present invention to provide methods and uses of said powdered
PCE-type copolymer for the improvement of mineral binder compositions and especially dry mortars.

Surprisingly it was found that the object of the present invention can be achieved according to claim 1 by a powdered copolymer P comprising at least 80 w %, preferably at least 85 w %, more preferably at least 90 w %, each based on the total weight of the powder, of a PCE-type copolymer comprising a) a molar parts of a structural unit S1 of formula I

b) b molar parts of a structural unit S2 of formula II

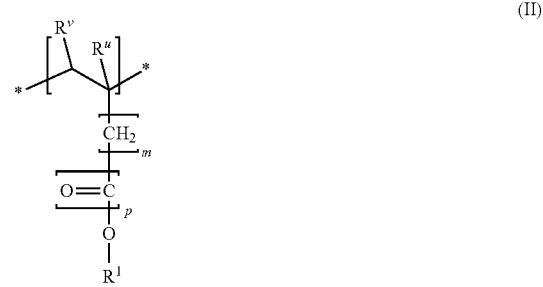

c) c molar parts of a structural unit S3 of formula III

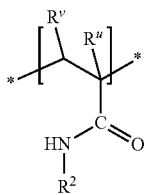

(III)

d) d molar parts of a structural unit S4 of formula IV

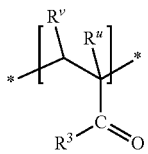

(IV)

wherein
each M independently from each other represents $H^+$, an alkali metal ion, an alkaline earth metal ion, a di- or trivalent metal ion, an ammonium ion or an organic ammonium group,
each $R^u$ independently from each other represents hydrogen or a methyl group,
each $R^v$ independently from each other represents hydrogen or COOM,
m=0, 1, 2 or 3,
p=0 or 1,
each $R^1$ and each $R^2$ independently from each other represents $C_1$ to $C_{20}$-alkyl,
-cycloalkyl, -alkylaryl or for —$[AO]_n$—$R^4$,
whereby A=$C_2$- to $C_4$-alkylene, $R^4$ represents H, $C_1$- to $C_{20}$-alkyl,
-cyclohexyl or -alkylaryl,
and n=2-350,
each $R^3$ independently of the others represents $NH_2$, —$NR^5R^6$, —$OR^7NR^8R^9$,
wherein $R^5$ and $R^6$ independently from each other stand are
$C_1$- to $C_{20}$-alkyl, -cycloalkyl
-alkylaryl or -aryl,
or for a hydroxyalkyl- or acetoxyethyl-($CH_3$—CO—O—$CH_2$—$CH_2$—) or
hydroxyisopropyl-(HO—CH($CH_3$)—$CH_2$—) or acetoxyisopropyl group
($CH_3$—CO—O—CH($CH_3$)—$CH_2$—);
or $R^5$ and $R^6$ together form a ring of which the nitrogen is part, to form a morpholine or imidazoline ring,
$R^7$ is a $C_2$-$C_4$-alkylene group,
each $R^8$ and $R^9$ independently from each other represent $C_1$- to $C_{20}$-alkyl,
-cycloalkyl, -alkylaryl,
-aryl or a hydroxyalkyl group,
and whereby a, b, c and d stand for the molar parts of the structural units S1, S2, S3 and S4, with
a/b/c/d/=(0.1-0.9)/(0.05-0.9)/(0.0-0.8)/(0.0-0.8),
and with the provision that a+b+c+d=1, and
characterized in that the powdered copolymer P has a particle size distribution with a D90 value of <250 μm, preferably <225 μm, especially <210 μm, a D10 value of <60 μm, preferably <50 μm, especially <40 μm, and a D50 value of between 70-130 μm, preferably 75-120 μm, especially 80-100 μm.

It was found that a powdered copolymer P as described above can advantageously be used in dry mortar formulations to reduce the water demand of the dry mortar and/or increase the fluidity of a composition based on said dry mortar.

It is another advantage of a powdered copolymer P of the present invention that a mineral binder composition comprising said powdered copolymer P has less segregation after mixing with mixing water.

It is yet another advantage of the present invention that the powdered copolymer P leads to an improved slump life of a mineral binder composition after mixing with water when compared to the same mineral binder composition without the powdered copolymer P but comprising PCE-type copolymers of the state-of-the-art. An improved slump life means that the change in slump flow after a certain time after mixing of a mineral binder composition with water is minimized.

Finally, it is an advantage of a powdered copolymer P of the present invention that the compressive strength of a cured mineral binder composition comprising said powdered copolymer P, especially when measured after 1 d or 3 d after the mixing with water, is increased when compared to a mineral binder composition with the same level of fluidity but comprising PCE-type copolymers of the state-of-the-art.

Further aspects of the invention are subject matter of further independent claims. Particularly preferred embodiments of the invention are subject matter of the dependent claims.

WAYS OF CARRYING OUT THE INVENTION

The expression "mineral binder" refers in the context of the present invention in particular to a binder, which in the presence of water reacts in a hydration reaction to form solid hydrates or hydrate phases. This can be, for example, a hydraulic binder (e.g. cement or hydraulic lime), a latent hydraulic binder (e.g. slag), a pozzolanic binder (e.g. fly ash) or a nonhydraulic binder (gypsum plaster or white lime). A "mineral binder composition" is accordingly a composition containing at least one mineral binder.

According to embodiments, the mineral binder or the mineral binder composition contains a hydraulic binder, preferably cement. Particular preference is given to a cement having a cement clinker content of ≥35% by weight. In particular, the cement is of the type CEM I, II, III (according to the standard EN 197-1) or a calcium aluminate cement (according to the standard EN 14647:2006-01) or a calcium sulphoaluminate cement or a mixture thereof. A proportion of the hydraulic binder in the total mineral binder is advantageously at least 5% by weight, in particular at least 20% by weight, preferably at least 35% by weight, especially at least 65% by weight. In a further advantageous embodiment, the mineral binder consists to an extent of at least 95% by weight of a hydraulic binder, in particular cement clinker.

In one advantageous embodiment the cement additionally contains up to 40 w %, preferably up to 35 w %, especially up to 20 w %, each based on the total dry weight of the cement, of a calcium sulfate. The calcium sulfate may be present in the form of calcium sulfate-hemihydrate, calcium sulfate-dihydrate and/or anhydrite.

According to further embodiments the binder composition comprises other binders in addition to or instead of a hydraulic binder. These are, in particular, latent hydraulic binders and/or pozzolanic binders. Suitable latent hydraulic and/or pozzolanic binders are, for example, slag, fly ash and/or silica dust. In an advantageous embodiment, the mineral binder contains 5-95% by weight, in particular 5-65% by weight, especially 15-35% by weight, of latent hydraulic and/or pozzolanic binders.

The term "aggregate" as used in the context of the present invention refers to mineral materials that are non-reactive in the hydration reaction of mineral binders. Aggregates can be any aggregate typically used for cementitious materials such as concrete, mortars, screeds, renders, grouts, coatings, putties or the like. Typical aggregates are for example rock, crushed stone, gravel, slag, limestone, sand, recycled concrete, perlite or vermiculite.

A "dry mortar" within the context of the present invention refers to a composition containing at least one mineral binder as described above and typically aggregates and additives selected from the group of plasticizers, superplasticizers, rheology modifiers, retarders, air-entrainers, de-aerating agents, corrosion inhibitors, fibers, synthetic organic polymers, expansion producing additives, pigments, strength enhancers, waterproofing additives, alkali-aggregate reaction inhibitors, chromate reducers, and/or anti-microbial agents. A dry mortar may contain a small amount of water. A dry mortar has a solid consistency, especially a powdered consistency. Dry mortars are typically pre-batched at a factory and delivered to a job site. Dry mortars can be formulated to be used as repair mortar for concrete, as screeds, renders, coatings, putties, grouts or water plugs, as well as for water-proofing or fireproofing applications.

A "particle size distribution" within the context of the present invention is a list of values that defines the relative amount of particles present according to size. The particle size distribution can be described by different D-values. For example, the D10 value is the diameter of the particle that 10% of particles of a given distribution are smaller than and 90% of particles of a given distribution are larger than. Also, the D90 value is the diameter at which 90% of a given sample is comprised of particles with a diameter less than this value. If not otherwise stated, the term "particle size" refers for the present purposes to a medium value of the particle size distribution of a solid. This medium value is given as the D50 value of a given particle size distribution and constitutes the value of the particle diameter at 50% in the cumulative distribution. The D50 value is usually interpreted as the particle size where 50% of the particles of a given distribution are larger and 50% are smaller. The D50 is thus a number median.

The particle size distribution and thus the different D-values as well as the particle size as defined above can in particular be determined by laser light scattering, preferably in accordance with the standard ISO 13320:2009. In particular, a Mastersizer 2000 instrument with a Hydro 2000G dispersing unit and the Mastersizer 2000 software from Malvern Instruments GmbH (Germany) can be used for this purpose.

The term "slump life" within the context of the present invention pertains to the time after mixing a mineral binder composition with water until the slump, as measured e.g. by ASTM C143, starts to decrease. Generally, a longer slump life is advantageous as the mineral binder composition will thus be workable for a longer time.

The powdered copolymer P of the present invention comprises at least 80 w %, preferably at least 85 w %, more preferably at least 90 w %, each based on the total weight of the powder, of a PCE-type copolymer comprising a) a molar parts of a structural unit S1 of formula I

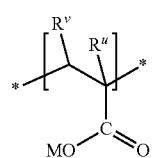

b) b molar parts of a structural unit S2 of formula II

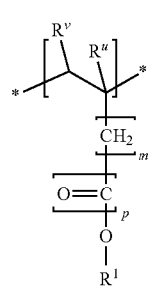

c) c molar parts of a structural unit S3 of formula III

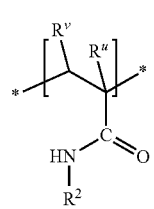

d) d molar parts of a structural unit S4 of formula IV

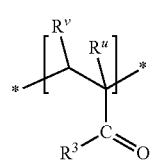

wherein
each M independently from each other represents $H^+$, an alkali metal ion, an alkaline earth metal ion, a di- or trivalent metal ion, an ammonium ion or an organic ammonium group,
each $R^u$ independently from each other represents hydrogen or a methyl group,
each $R^v$ independently from each other represents hydrogen or COOM,
m=0, 1, 2 or 3,
p=0 or 1,
each $R^1$ and each $R^2$ independently from each other represents $C_1$- to $C_{20}$-alkyl,
-cycloalkyl, -alkylaryl or for $-[AO]_n-R^4$,
whereby A=$C_2$- to $C_4$-alkylene, $R^4$ represents H, $C_1$- to $C_{20}$-alkyl,
-cyclohexyl or -alkylaryl,
and n=2-350, each $R^3$ independently of the others represents $NH_2$, $-NR^5R^6$, $-OR^7NR^8R^9$,
  wherein $R^5$ and $R^6$ independently from each other stand are
    $C_1$- to $C_{20}$-alkyl, -cycloalkyl
    -alkylaryl or -aryl,
    or for a hydroxyalkyl- or acetoxyethyl- ($CH_3$—CO—O—$CH_2$—$CH_2$—) or
    hydroxyisopropyl- (HO—CH($CH_3$)—$CH_2$—) or acetoxyisopropyl group
      ($CH_3$—CO—O—CH($CH_3$)—$CH_2$—);
  or $R^5$ and $R^6$ together form a ring of which the nitrogen is part, to form a morpholine or imidazoline ring,
  $R^7$ is a $C_2$-$C_4$-alkylene group,
  each $R^8$ and $R^9$ independently from each other represent $C_1$- to $C_{20}$-alkyl,
    -cycloalkyl, -alkylaryl,
    -aryl or a hydroxyalkyl group,
and whereby a, b, c and d stand for the molar parts of the structural units S1, S2, S3 and S4, with
  a/b/c/d=(0.1-0.9)/(0.05-0.9)/(0-0.8)/(0.0-0.8), in particular a/b/c/d=(0.3-0.9)/(0.05-0.7)/(0-0.3)/(0.0-0.4) and with the provision that a+b+c+d=1.

PCE-type copolymers with n=8-250, more preferably n=11-200, still more preferably n=20-150, most preferably n=30-125, especially n=50-115 turned out to be particularly advantageous for the use in dry mortars.

Advantageously, the molar parts of the structural units S1, S2, S3 and S4 are chosen as follows: a/b/c/d=(0.3-0.9)/(0.05-0.9)/(0-0.3)/(0-0.4), preferably a/b/c/d=(0.3-0.9)/(0.05-0.7)/0/0.

According to particular advantageous embodiments, the ratio of a/b is between 0.5/1 and 15/1, preferably between 1/1 and 11/1, more preferably between 1.5/1 and 9/1, most preferably between 3/1 and 8/1, especially between 6/1 and 7/1. A ratio of a/b within the preferred limits leads to an improved performance of the powdered copolymer P when used in mineral binder composition and especially in dry mortars. Thus a powdered copolymer P with an a/b ratio within the preferred limits gives an increased initial flowability and a higher compressive strength of a mineral binder or mineral binder composition when compared to a powdered copolymer P with another ratio of a/b.

According to a particularly advantageous embodiment, $R^u$ and $R^v$ each represent a hydrogen or a methyl group, m=1, p=0 and $R^1$ represents
—[AO]$_n$—$R^4$ where A represents a $C_2$-alkylene, n=50-115, and $R^4$ being selected from H or $CH_3$.

Preferably, the average molecular weight (Mw) of the PCE-type copolymer is 5'000-150'000 g/mol, in particular 10'000-100'000 g/mol. The average molecular weight is in particular measured using gel permeation chromatography (GPC) with polyethylenglycol (PEG) as standard.

In particular, the structural units S1, S2, S3, and S4 together have a combined molecular weight, which amounts to at least 50 wt.-%, preferably at least 90 wt.-%, in particular at least 95 wt.-%, each based on the total dry weight of the PCE-type copolymer.

Methods for producing such PCE-type copolymers are known in the art. Two main methods are industrially used for synthesizing such PCE-type copolymers. The first method is radical polymerisation of ethylenically unsaturated monomers. Side chains of the resulting PCE-type copolymers are already attached to monomer units. PCE-type copolymers with desired structures and properties are obtained by specific selection and ratio of the monomers, especially the amount of acrylic and methacrylic acid monomers in the polymerization reaction solution. Such radical polymerisation as well as resulting PCE-type copolymers are described, for example, in WO2012/084954.

In a preferred embodiment of the invention, the PCE-type copolymers are those which were obtained by radical polymerisation. Typically the radical polymerisation is regulated, preferably with sodium hypophosphite as regulator. In a particularly preferred embodiment, the radical polymerisation is carried out at room temperature.

In a second method known as polymer analogous reaction, a polycarboxylic acid backbone is synthesized in a first step. Subsequently, side chains are attached to the polycarboxylic acid backbone, for example by esterification, amidation or etherisation reactions with alcohols, amines and the like. Such polymer analogous reactions as well as resulting PCE-type copolymers are described, for example, in EP1138697 and WO2005/090416.

It is possible that further monomers are contained in a PCE-type copolymer of the present invention. Examples for such further monomers are styrene, α-methylstyrene, vinylacetate, isobutylene, diisobutylene, cyclopentadiene, ethylene, propoylene, N-vinylpyrrolidone, acrylamide, methacrylamide, methylvinylether, ethylvinylether, allylsulfonic acid, acrylamidomethylpropene sulfonic acid, styrene sulfonic acid, butadiene, and acrylonitrile. The sum of the molecular weight of any further monomers contained in a PCE-type copolymer of the present invention is less than 50 w %, preferably less than 10 w %, in particular less than 5 w %, each based on the total dry weight of the PCE-type copolymer.

The powdered copolymer P of the present invention is characterized by a particle size distribution with a D90 value of <250 μm, preferably <225 μm, especially <210 μm, a D10 value of <60 μm, preferably <50 μm, especially <40 μm, and a D50 value of between 70-130 μm, preferably 75-120 μm, especially 80-100 μm.

The powdered copolymer P of the present invention is obtainable by spray-drying an aqueous solution of a PCE-type copolymer as described above.

There is no particular limitation as to the concentration of the PCE-type copolymer in the aqueous solution prior to spray-drying. It can, however, be preferred to use an aqueous solution with a concentration of the PCE-type copolymer of at least 20 w %, more preferably at least 40 w %, and up to 75 w %, each based on the total weight of said aqueous solution.

The pH of the aqueous solution of the PCE-type copolymer is adjusted to >7, preferably >9, especially >10 prior to spray-drying. Such pH of the aqueous solution of the PCE-type copolymer used for spray-drying leads to a finer particle size of the powdered copolymer P of the present invention and to a powder with less tendency for caking.

A pH <7 of the aqueous solution of the PCE-type copolymer leads to increased stickiness and caking during spray-drying. According to embodiments, the pH of the aqueous solution of the PCE-type copolymer is adjusted according to the number n of repeating units —[AO]—. As the number n increases, the pH needs to be increased to prevent stickiness and caking during spray-drying. According to a particularly preferred embodiment, the number n is between 50 and 115 and the pH is adjusted to at least 10.

According to embodiments, the pH is adjusted by the addition of oxides or hydroxides of alkali metals, alkali earth metals or mixtures thereof. Preferably, the pH of the aqueous solution of the PCE-type copolymer is adjusted by the addition of NaOH, KOH, MgO, Mg(OH)$_2$, CaO, or Ca(OH)$_2$, most preferred is Ca(OH)$_2$.

Spray-drying is a known method for producing a dry powder from a liquid by spraying in combination with rapidly drying the solution. Drying can be performed with a hot gas, preferably hot air or hot nitrogen. It is possible that the hot gas is blown in the same direction as the sprayed liquid. It is likewise possible that the hot gas is blown in the opposite direction as the sprayed liquid. The liquid is dispersed with a spray nozzle or an atomizer, the inlet being preferably in the upper part of a spray tower. The dried powder can be separated from the hot gas by means of a cyclone.

Preferably, the aqueous solution of a PCE-type copolymer is pre-heated before entering the spray dryer. If no gas is used for the drying, the PCE-type copolymer solution can be introduced into the spray dryer at a pressure of between 0.2 and 40 MPa. If a gas is used for the drying, the PCE-type copolymer solution can be introduced into the spray dryer at ambient pressure. Preferably, drying is carried out with hot air or hot nitrogen, preferably the gas is blown in the same direction as the sprayed liquid. The spray-drying may be carried out at an inlet temperature between 90 and 300° C., preferably between 100 and 200° C., more preferably between 110 and 150° C., especially between 110 and 120° C. A lower inlet temperature has the advantage of lower energy consumption as well as lower tendency for degradation of the PCE-type copolymer. The outlet temperature may be between 55 and 200° C., preferably between 60 and 150° C., more preferably between 65 and 100° C.

The aqueous solution of the PCE-type copolymer can be entered into the spray-dryer by any means known to the person skilled in the art such as nozzles, atomizers, or centrifuges. Any spry-dryer known to the person skilled in the art is suitable to produce a powdered copolymer P of the present invention. The size of the spray-dryer can be selected according to the intended throughput.

According to preferred embodiments, the powdered copolymer P contains other additives. Preferred additives are anti-caking agents and anti-oxidants which stabilize the powder against thermo-oxidative degradation and self-ignition.

Suitable anti-caking agents can be any known to the person skilled in the art. Examples for anti-caking agents include powdered cellulose, magnesium stearate, calcium carbonate, dolomite, clay, kaolin, vermiculite, bentonite, talc, slag, fly ash, silicates or aluminosilicates, and silicon dioxide, such as for example fumed silica, precipitated silica, silica gels or silica sols.

Suitable anti-oxidants can be any known to the person skilled in the art. Examples for anti-oxidants are for example disclosed in WO 00/17263 and include alkylated monophenols, alkylated hydrochinones, alkylidene-bisphenols, hydroxylated benzyls, phenol-thiodiphenyl ethers, acylaminophenols, phenolic esters, and phenolic amides.

According to embodiments any such other additives are added before the spray-drying process as this will lead to increased performance of such additives. The additives can be added to the aqueous solution of the PCE-type copolymer prior to spray drying. It is likewise possible to add one or more additives during the spray-drying process, for example via a separate feeding nozzle.

According to embodiments the content of any such other additives in the powdered copolymer P is less than 5 w %, preferably less than 2 w %, more preferred less than 1.5 w %, especially less than 1 w %, each based on the total weight of said aqueous solution.

The resulting powder product may be sieved in order to remove small agglomerates, which might potentially be formed.

The spray-drying process can be performed continuously or discontinuously.

In preferred embodiments of the invention, the solid copolymer P is a powder. The powder may be converted into another solid forms, for example by pressing. Thus the inventive copolymer P may also take the form of a granulate, a shaped block, a tablet or the like.

A powdered copolymer P of the present invention shows an alkaline reaction with water. A powdered copolymer P of the present invention can be fully redispersed in water. Such a redispersion in water with a concentration of a powdered copolymer P of the present invention of 40 w % has a pH of at least 8, preferably of at least 10, especially of at least 11.

As additional aspect, the present invention relates to mineral binders or mineral binder compositions, especially dry mortars, containing a powdered copolymer P of the present invention. The mineral binder is as defined above. The mineral binder composition may take the form, for example, of a dry composition or of a fluid or stiffened binder composition mixed up with mixing water. The mineral binder composition may also take the form of a fully cured mineral binder composition—for example, a shaped body.

The mineral binders or mineral binder compositions preferably contain a powdered copolymer P of the present invention in an amount of 0.01-10 w %, preferably 0.05-5 w %, more preferably 0.1-2 w %, especially 0.15-0.8 w % based on the total weight of the mineral binder. Due to the improved performance of the powdered copolymer P of the present invention the dosage of said powdered copolymer P in a mineral binder composition can be low.

A mineral binder composition, especially a dry mortar, of the present invention may additional contain aggregates, preferably sand. Sand is a naturally occurring granular material composed of finely divided rock or mineral particles. It is available in various forms and sizes. Examples of suitable sand are quartz sand, limestone sand, river sand or crushed aggregates. Suitable sand are for example described in standards ASTM C778 or EN 196-1.

Preferably, at least part of the sand is quartz sand or limestone sand or a mixture thereof, especially preferred is quartz sand, since it is chemically inert, strong, available in various sizes and the fluidity of the composition can be set advantageously.

Commonly, sand is supplied in different fractions of grains passing through a sieve with clear openings. Preferred is sand of which at least 95 w % are smaller than 5 mm, more preferred smaller than 4 mm, even more preferred smaller than 3.5 mm. Large particles may lead to improper mixing.

Preferably, at least part of the sand has a particle size of at least 100 μm, more preferred at least 200 μm. Such granulometry enables an optimized grain size distribution for homogeneous mixing, good rheology of the fresh mortar and high strength of the hardened mortar.

Preferred sand has a particle size from 0.04 to 5 mm, more preferred from 0.05 to 4 mm and even more preferred from 0.05 to 3.6 mm.

A preferred mineral binder composition, especially a dry mortar, of the present invention thus comprises from 10-80 w %, preferably 25-70 w %, especially 40-65 w %, based on the total dry weight said mineral binder composition, of sand.

It can be advantageous if the mineral binder composition, especially the dry mortar, of the present invention additionally contains other additives for mineral binder compositions, in particular cementitious binder compositions. Such additives can be for example, plasticizers, superplasticizers, rheology modifiers, retarders, air-entrainers, de-aerating agents, corrosion inhibitors, fibers, synthetic organic polymers, expansion producing additives, pigments, strength enhancers, waterproofing additives, alkali-aggregate reaction inhibitors, chromate reducers, and/or anti-microbial agents.

According to embodiments, a synthetic organic polymer, which is different from the PCE-type copolymers as described above, is contained in a mineral binder composition of the present invention. Synthetic organic polymers can be produced by radical polymerization of monomers selected form the group consisting of ethylene, propylene, butylene, isoprene, butadiene, styrene, acrylonitrile, acrylic acid, methacrylic acid, esters of acrylic acid, esters of methacrylic acid, vinylesters, vinylchloride. It is preferred that synthetic organic polymers are copolymers synthesized from two or more, preferably two, different monomers. The sequence of the copolymer can be alternating, blocked or random. Preferred synthetic organic polymers are copolymers of vinylacetate and ethylene, vinylacetate and ethylene and methylmethacrylate, vinylacetate and ethylene and vinylester, vinylacetate and ethylene and acrylic acid ester, vinylchloride and ethylene and vinyllaureate, vinylacetate and vinylveratate, acrylic ester and styrene, acrylic ester and styrene and butadiene, acrylic ester and acrylonitrile, styrene and butadiene, acrylic acid and styrene, methacrylic acid and styrene, styrene and acrylic acid ester, styrene and methacrylic acid ester.

The glass transition temperature (Tg) of said synthetic organic polymers can vary in a wide range. Tg of suitable synthetic organic polymers can be for example between −50° C. and +60° C., preferably between −45° C. and +50° C., more preferred between −25° C. and +35° C.

It is possible and in certain cases preferred to use mixtures of more than one of the said synthetic organic polymers in compositions of the present invention.

According to embodiments synthetic organic polymers are used in solid form such as for example redispersible polymer powders. Such redispersible powders can be manufactured for example by spray drying of polymer dispersions as for example described in patent application EP1042391. Suitable redispersible powders are for example available from Wacker Chemie AG under the trade name Vinnapas. The use of redispersible powders of synthetic organic polymers is preferred for the context of the present invention.

A preferred mineral binder composition, especially a dry mortar, of the present invention thus comprises
a) 10-50 w % of at least one mineral binder,
b) 0.01-10 w %, preferably 0.05-5 w %, more preferably 0.1-2 w %, especially 0.15-0.8 w % of a powdered copolymer P,
c) 0-80 w %, preferably 10-65 w % of aggregate,
d) 0-10 w %, preferably 0.1-6 w % of other additives selected from the group of plasticizers, superplasticizers, rheology modifiers, retarders, air-entrainers, de-aerating agents, corrosion inhibitors, fibers, synthetic organic polymers, expansion producing additives, pigments, strength enhancers, waterproofing additives, alkali-aggregate reaction inhibitors, chromate reducers, and/or anti-microbial agents, and
e) optionally water,
each based on the total weight of the mineral binder composition.

Mixing of the components a) to e) is possible in any given order by mixers commonly used in the production of mineral binders, mortars or concrete. A mineral binder composition, especially a dry mortar, of the present invention can be pre-batched in a factory. It is likewise possible that a mineral binder composition, especially a dry mortar, of the present invention is mixed at a job site.

It is preferred within the context of the present invention that the mineral binder composition is a dry composition, for example a dry mortar composition. It is therefore preferable, that the mineral binder composition is essentially free of water.

It was found that a mineral binder or mineral binder composition containing a powdered copolymer P as described above has increased flowability, reduced loss of slump, increased compressive strength, especially at early age, when compared to the same mineral binder or mineral binder composition with a comparative powdered copolymer.

The powdered copolymer P as described above can thus be used in a method to increase the flowability of a mineral binder or mineral binder composition.

The powdered copolymer P as described above can further be used in a method to keep the flowability of a mineral binder composition over a defined period of time after mixing with water, for example over 20 min, preferably over 30 min, more preferably over 45 min.

A powdered copolymer P as described above can also be used in a method to reduce the water demand of a mineral binder or a mineral binder composition.

Finally, the powdered copolymer P as described above can be used in a method to increase the compressive strength of a mineral binder or mineral binder composition, especially at 1 d and/or 3 d after mixing with water.

BRIEF DESCRIPTION OF FIGURES

FIG. 1 shows a particle size distribution of polymer powders P1 and P2 as prepared according to the following working examples.

The following working examples illustrate the invention. The examples are not intended to limit the scope of the invention in any way.

Working Examples

Preparation of Polymer Solution SP1

330 g of water, 330 g of methallyl polyethylene glycol (OH-terminated, $M_w$=4000 g/mol), 42 g of acrylic acid, 102 g of a 16% aqueous solution of NaOH, 1.5 g of a 10% aqueous solution of $Fe(II)SO_4 \cdot 7\ H_2O$, and 2 g sodium hypophosphite were added into a reaction vessel with a stirrer.

Then 10 g of a 30% aqueous hydrogen peroxide solution and 4 g of a 5% aqueous rongalite solution were added dropwise at a temperature of 20° C.-35° C. over a period of 70 min with stirring.

120 minutes after the start of the dropwise addition, a clear viscous polymer solution was obtained.

Preparation of Polymer Solution SP2

Polymer SP2 was prepared as polymer SP1 above but with 366 g of methallyl polyethylene glycol (OH-terminated, $M_w$=2400 g/mol).

Preparation of Polymer Solution SP3

145 g of a 50 w % aqueous solution of partly neutralized polyacrylic acid ($M_w$=4000 g/mol), and 7.5 g 50 w % sulfuric acid were placed in a glass reactor fitted with a thermometer, stirrer, a gas inlet tube, and a distillation assembly. The solution was heated to 70° C. and a mixture of 52 g of methoxy-terminated polyethylene glycol with $M_w$=1000 g/mol and 300 g of methoxy-terminated polyethylene glycol with $M_w$=3000 g/mol was added. The mixture was heated up under a steady stream of nitrogen and kept at 165° C. After stirring at this temperature for 6 h, the mixture was allowed to cool to room temperature. The pH of the resulting mixture was appr. 3.

Preparation of Polymer Solution SP4

Polymer SP4 was prepared as polymer SP3 above but with 347.5 g of methoxy-terminated polyethylene glycol with $M_w$=5000 g/mol instead of the mixture of two different methoxy-terminated polyethylene glycols. The pH of the resulting mixture was appr. 3.

Preparation of Polymer Powder P1

3g of $Ca(OH)_2$, 68 g of water, and 3 g of fumed silica (Aerosil® 150 from Evonik) were added to 200 g of SP1. The resulting suspension had a pH of appr. 13. The resulting suspension was dried in a lab spray dryer of the type Mini Spray Dryer B-290 (Büchi AG, Switzerland). Spray drying was conducted by inserting the suspension with a nozzle at the head of the spray dryer. Compressed air flowing in the same direction as the sprayed material was used at a flow rate of 600 L/h and with a pressure of 0.5 MPa. The inlet temperature was 120° C. The dosage speed was adjusted so that the outlet temperature reached 65-70° C. The discharged powder was separated from the air stream by means of a cyclotrone.

Preparation of Polymer Powder P2

The polymer powder P2 was prepared as polymer powder P1 above but the amount of $Ca(OH)_2$ was adjusted to 60 mg. The pH of the resulting suspension was appr. 9.

Preparation of Polymer Powder P3

The polymer powder P3 was prepared as polymer powder P1 above but without the addition of $Ca(OH)_2$. The pH of the resulting suspension was appr. 5.

Preparation of Polymer Powder P4

The polymer powder P4 was prepared as polymer powder P1 above but SP2 was used instead of SP1.

Preparation of Polymer Powder P5

Polymer solution SP3 was poured into an open aluminum dish of appr. 100 mm diameter and 7 mm height and dried under ambient temperature and pressure. The resulting solid material was grinded to form a fine powder with a standard mortar and pestle.

Preparation of Polymer Powder P6

Polymer powder P6 was prepared as polymer powder P5 above but using polymer solution SP4 instead of SP3.

The following table 1 shows an overview of the powders obtained. Polymer powders P1 and P4 are according to the present invention.

TABLE 1

| Powder | Polymer Solution (SP) | pH of SP | Particle size [μm] | | | Performance | |
|---|---|---|---|---|---|---|---|
| | | | D10 | D50 | D90 | Spray drying | Powder |
| P1 | SP1 | 13 | 35 | 87 | 187 | excellent | no caking |
| P2 | SP1 | 9 | 44 | 105 | 202 | excellent | caking |
| P3 (Ref) | SP1 | 5 | n.m. | n.m. | n.m. | not possible | |
| P4 | SP2 | 13 | 32 | 86 | 206 | excellent | no caking |
| P5 (Ref) | SP3 | 3 | n.m. | n.m. | n.m. | n.m. | no caking |
| P6 (Ref) | SP4 | 3 | n.m. | n.m. | n.m. | n.m. | no caking | n.m.: not measured

It can be seen from the above table 1 that spray-drying is possible from polymer solution SP1 only if the pH is 9 or higher. If the polymer solution has a pH of only 5, no powder could be obtained. It can further be seen that if the pH of the polymer solution is increased to 13, a finer powder P with non-caking properties can be obtained.

Performance Testing in Cementitious Compositions (Examples M1-M6)

The slump flow test, as a measure for fluidity of the cementitious mixture, was performed according to JC/T 985-2005 for examples M1-M3 and according to GB/T 50448-2008 for examples M4-M6. The slump flow test was performed on individual samples at defined points of time after mixing with mixing water.

Compressive strength was determined according to standard GB/T17671-1999 using 4×4×16 cm prisms after the time of curing at 23° C./50% r.h as indicated in tables 2-4 below.

Linear shrinkage was measured according to JC/T 985-2005 after 28 d of curing at 23° C./50% r.h.

For the preparation of examples M1-M3, 200 g of cement (CEM I 52.5), 340 g of calcium aluminate cement, 160 g of α-hemihydrate, 400 g of limestone, 860 g of quartz sand (0.1-0.3 mm grain), and 4 g of the powder P1, P4, and P6 respectively were dry mixed in a Hobart mixer for 1 minute at 23° C. to give a dry mortar.

Within 10 seconds mixing water was added to the dry mix to give a water/binder ratio of 0.22. Mixing was continued for 170 seconds.

The following table 2 shows an overview of the results.

TABLE 2

| Example | Powder used | Slump flow [mm] | | | Compressive strength [MPa] after 1 d | Shrinkage [%] |
|---|---|---|---|---|---|---|
| | | 0 min | 20 min | [%] | | |
| M1 | P1 | 143 | 120 | −16 | 9.0 | −0.068 |
| M2 | P4 | 129 | 112 | −13 | 7.4 | −0.079 |
| M3 (Ref) | P6 | 155 | 123 | −21 | 7.1 | −0.090 |

These results show that powders P1 and P4, which are according to the present invention, have good liquefying properties and especially low loss of slump flow over time. Powders according to the present invention also lead to increased compressive strength after 1 d as well as to low shrinkage.

For the preparation of examples M4-M6, 750 g of cement (CEM I 52.5), 120 g of blast furnace slag, 40 g of silica fume, 340 g of fine quartz sand, 120 g of fine river sand (grain size 0.3-0.6 mm), 560 g of coarse river sand (grain size 0.6-2.3 mm), and 2.8 g of the powder P1, P4, and P5 respectively were dry mixed in a Hobart mixer for 1 minute at 23° C. to give a dry mortar.

Within 10 seconds mixing water was added to the dry mix to give a water/binder ratio of 0.15. Mixing was continued for 170 seconds.

The following table 3 shows an overview of the results.

TABLE 3

| Examples | Powder used | Slump flow [mm] 0 min | 20 min | Delta [%] | Compressive strength [MPa] after 3 d |
|---|---|---|---|---|---|
| M4 | P1 | 360 | 350 | −3 | 65.5 |
| M5 | P4 | 335 | 338 | +1 | 60.3 |
| M6 (Ref) | P5 | 350 | 323 | −8 | 58.3 |

These results show that powders P1 and P4, which are according to the present invention, have good liquefying properties and especially low loss of slump flow over time. Powders according to the present invention also lead to increased compressive strength after 3 d.

The invention claimed is:

1. A process for the production of a powdered copolymer P, said process comprising the steps of
   i) preparing an aqueous copolymer solution comprising 30-99 w %, based on the total weight of said aqueous solution, of a PCE-type copolymer comprising
      a) a molar parts of a structural unit S1 of formula I

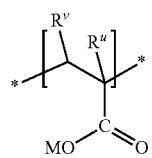
(I)

b) b molar parts of a structural unit S2 of formula II

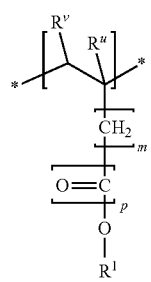
(II)

c) c molar parts of a structural unit S3 of formula III

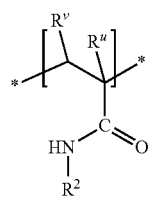
(III)

and d) d molar parts of a structural unit S4 of formula IV

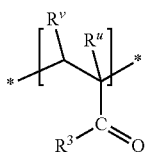
(IV)

wherein
   each M independently from each other represents H+, an alkali metal ion, an alkaline earth metal ion, a di- or trivalent metal ion, an ammonium ion or an organic ammonium group,
   each $R^u$ independently from each other represents hydrogen or a methyl group,
   each $R^v$ independently from each other represents hydrogen or COOM,
   m is 0, 1, 2 or 3,
   p is 0 or 1,
   each $R^1$ and each $R^2$ independently from each other represents
      $C_1$- to $C_{20}$-alkyl,
      -cycloalkyl,
      -alkylaryl or
      for -[AO]$_n$—$R^4$, where
         A represents a $C_2$- to $C_4$-alkylene,
         $R^4$ represents H, $C_1$- to $C_{20}$-alkyl, -cyclohexyl or -alkylaryl, and
         n is an integer in the range of from 2-350,
   each $R^3$ independently of the others represents $NH_2$, —$NR^5R^6$, —$OR^7NR^8R^9$,
      wherein $R^5$ and $R^6$ independently from each other stand for
         $C_1$- to $C_{20}$-alkyl, -cycloalkyl
         alkylaryl or -aryl,
         or for a hydroxyalkyl- or acetoxyethyl-($CH_3$—CO—O—$CH_2$—$CH_2$—) or hydroxyisopropyl-(HO—CH($CH_3$)—$CH_2$—) or acetoxyisopropyl group ($CH_3$—CO—O—CH($CH_3$)—$CH_2$—);
      or $R^5$ and $R^6$ together form a ring of which the nitrogen is part, to form a morpholine or imidazoline ring,
      $R^7$ is a $C_2$-$C_4$-alkylene group,
      each $R^8$ and $R^9$ independently from each other represent $C_1$- to $C_{20}$-alkyl,
         -cycloalkyl, -alkylaryl,
         -aryl or a hydroxyalkyl group,
   and a, b, c and d stand for the molar parts of the structural units S1, S2, S3 and S4, with a/b/c/d having values in the following ranges: (0.1-0.9)/(0.1-0.9)/(0-0.8)/(0-0.8), with the provision that a+b+c+d is equal to 1,
   ii) adding a base to adjust the pH of the aqueous copolymer solution to at least 10,
   iii) adding 0.01 to 5 w %, based on the weight of the aqueous copolymer solution, of at least one additive selected from anti-caking agents and/or anti-oxidants,
   iv) spray-drying the aqueous copolymer solution to obtain a powder, and
   v) optionally sieving.

2. A process according to claim 1 wherein the powdered copolymer P that is obtained after spray-drying the aqueous copolymer solution has a particle size distribution with a D90 of <250 μm, a D10 of <60 μm, and a D50 of between 70-130 μm.

3. A process according to claim 1 wherein
each $R^1$ and $R^2$ in the powdered copolymer P independently from each other represents $-[AO]_n-R^4$,
each $R^4$ independently from each other is selected from H or $CH_3$, and
n is an integer in the range of from 50-115.

4. A process according to claim 1 wherein the ratio of a/b in the powdered copolymer P is in the range of from 0.5/1 and 15/1.

5. A process according to claim 1, wherein the PCE-type copolymer in step i) is prepared by a radical polymerization process.

6. A process according to claim 1, wherein the base added in step ii) is chosen from LiOH, NaOH, KOH, $Mg(OH)_2$, $Ca(OH)_2$ or mixtures thereof.

7. A process according to claim 6, wherein
the base added in step ii) is $Ca(OH)_2$ and
the pH of the aqueous copolymer solution is between 10 and 14.

8. A process according to claim 1, wherein step iv) is performed at a spray-dry inlet temperature of not more than 150° C.

9. The process according to claim 1, wherein the base added in step ii) is added in an amount effective to adjust the pH of the aqueous copolymer solution to at least 11.

* * * * *